Sept. 28, 1965       F. G. RODRIQUEZ ETAL       3,208,722
                         COMPRESSED AIR MOTOR
Filed Sept. 5, 1963                              2 Sheets-Sheet 2
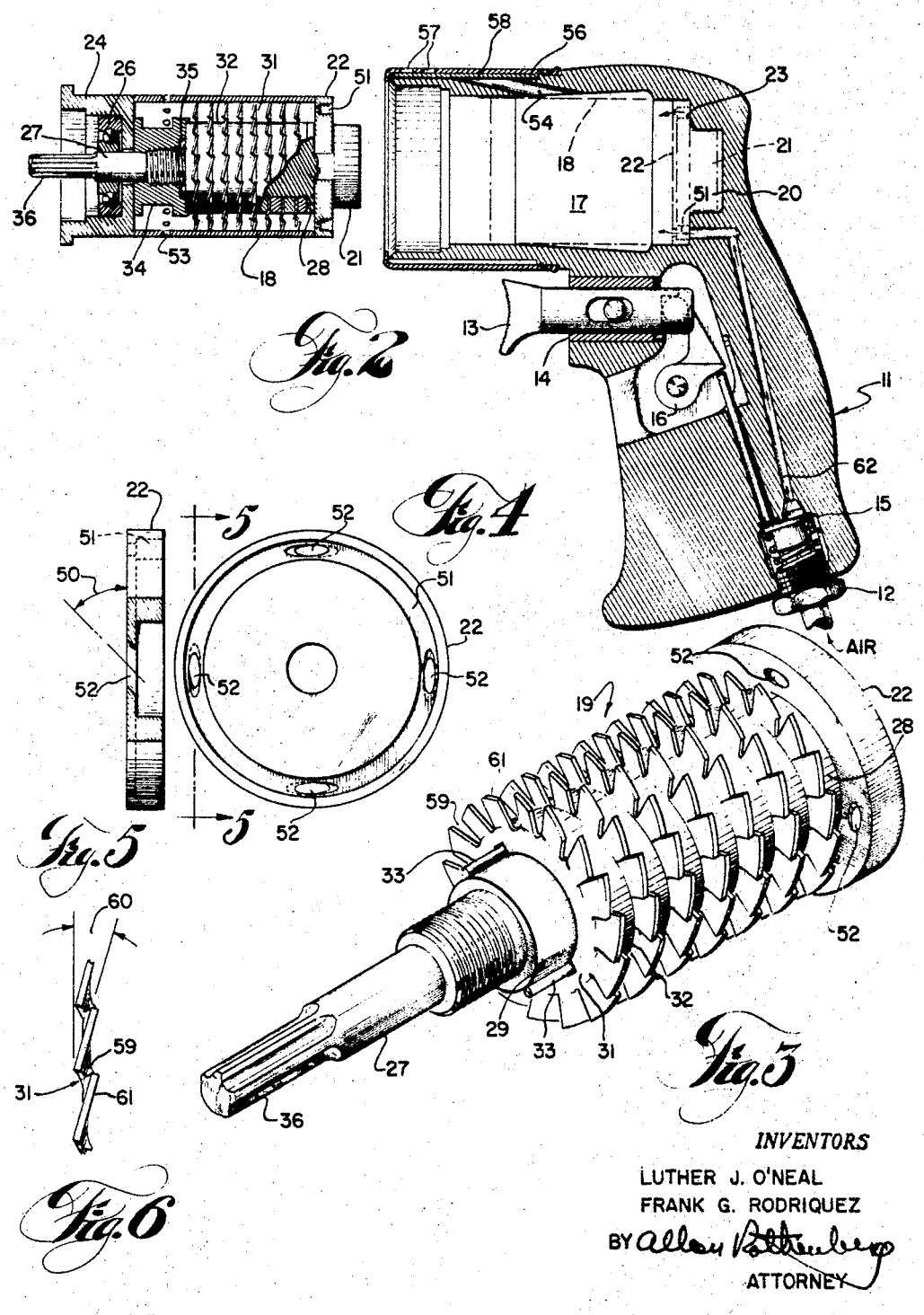
INVENTORS
LUTHER J. O'NEAL
FRANK G. RODRIQUEZ
BY Allan Rottenberg
ATTORNEY

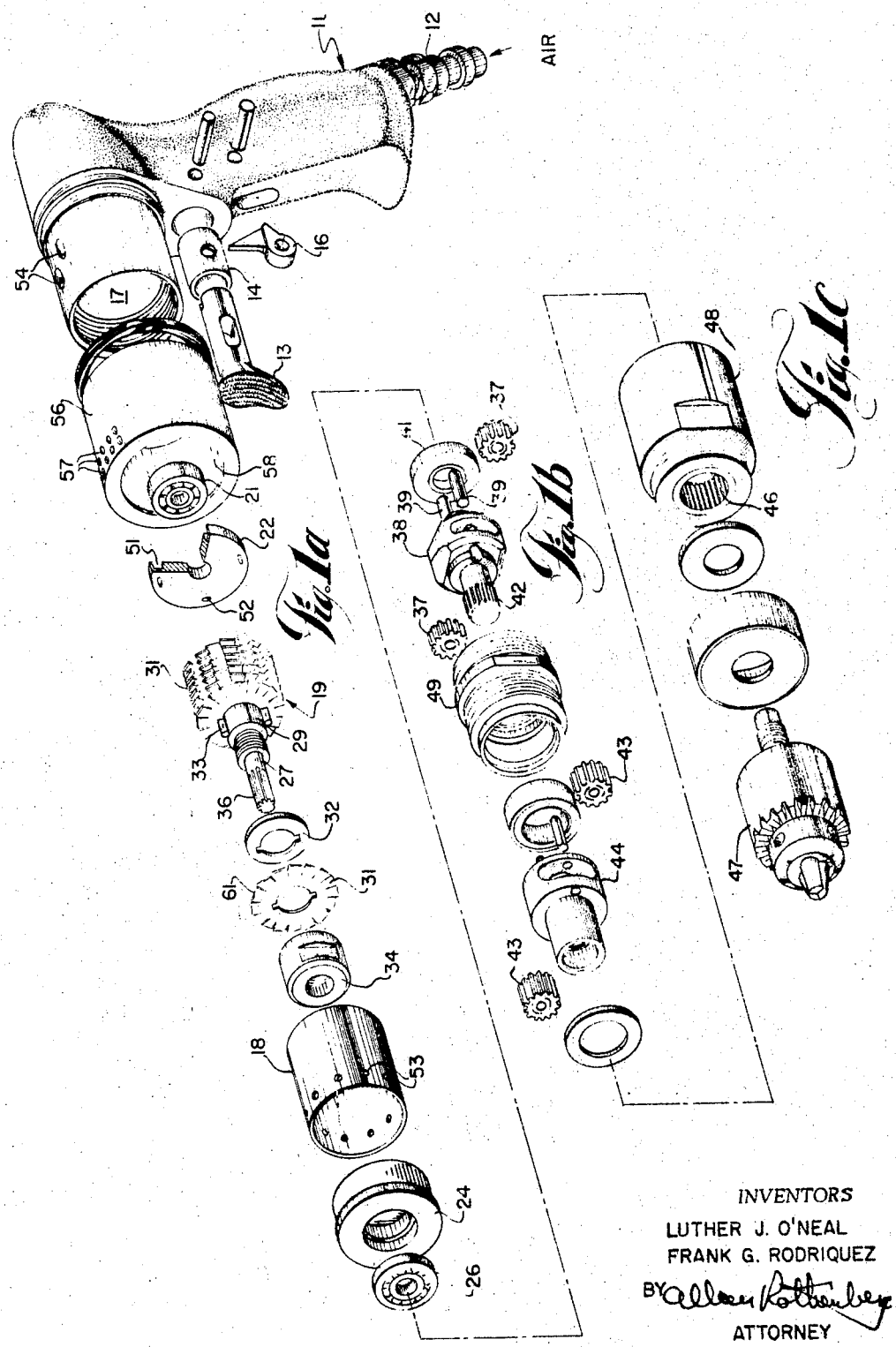

United States Patent Office

3,208,722
Patented Sept. 28, 1965

3,208,722
COMPRESSED AIR MOTOR
Frank G. Rodriquez, Bellflower, and Luther J. O'Neal, Torrance, Calif., assignors to North American Aviation Inc.
Filed Sept. 5, 1963, Ser. No. 306,931
11 Claims. (Cl. 253—3)

This invention relates to fluid powered motors and, more specifically to a compressed air powered turbine.

In many industrial operations economies are achieved by operating rotating tools with compressed air rather than electricity. Many hand tools are so operated to afford a long operating lifetime with consequent economies. In addition many modern industrial environments for assembly of precision instruments require a dust free condition wherein no particles are evolved from operating machinery. Such a requirement precludes the use of electric motors that employ brushes and commutators which generate small amounts of particulate matter. Thus, for example, a high quality dust free area may have no more than 200 particles in the size range of 5 to 65 microns per cubic foot of air. By way of contrast a clean, closed work area will often have 1000 to 2000 particles per cubic foot of air and an open industrial area will often have many thousand particles.

Previously available air powered motors have been highly inefficient and consumed large quantities of air to produce a reasonable torque or have employed slide vanes in rubbing contact with walls causing wear and generating particles of material. These previously available motors have required lubricants on parts that are present in the stream of gas and the lubricants vaporize or are entrained to emit materials objectionable in dust free areas.

An additional problem is encountered in the fabrication of many of the modern high strength materials which have come into wide use in aircraft and other industries. Because of the hardness, toughness, and galling characteristics of these materials, machining operations have become difficult, slow and expensive. The drilling of small holes in many of the modern metals with hand operated equipment is extremely difficult.

It is therefore a broad object of this invention to provide a compressed air motor for operation in a dust free environment.

It is another broad object of this invention to provide a hand operated drill.

Thus, in the practice of this invention according to a preferred embodiment there is provided a hand drill operated by compressed air. This drill employs a rotatably mounted multi-stage turbine. Compressed air is directed against a large plurality of small driving blades arranged in a plurality of expansion stages on a rotor in a smooth bore stator. The driving blades are angularly pitched relative to the axis of the rotor to provide a driving torque. The rotor is constructed with a solid body portion extending radially substantially to the roots of the blades to provide a large rotational inertia mass. Close spacing is provided between the blades along and around the rotor to minimize air consumption and provide a high driving torque. A high ratio gear reduction unit changes the high speed rotation of the rotor to a reasonable rotating speed on a chuck. The bearings supporting the rotor are mounted in areas outside of the flow of compressed air, so that the air passes over only dry, non-rubbing parts. The drill provides high torque and employs a relatively small quantity of air. Additionally the drill is particularly useful in drilling high strength materials that are resistant to drilling with other available devices. Further the drill operates without emission of particulate matter or oil which would be objectionable in a dust free environment.

Thus, it is a broad object of this invention to provide a fluid powered motor.

It is another object of this invention to provide a hand operated compressed air drill.

It is still another object of this invention to provide a drill for use in a dust free environment.

It is an additional object of this invention to provide a means for drilling high strength materials.

Other objects and many of the attendant advantages of this invention will be readily appreciated as the same becomes better understood by reference to the following detailed description when considered in connection with the accompanying drawings wherein:

FIGS. 1a, 1b and 1c collectively comprise an exploded view of a hand drill employing an air motor constructed according to the principles of this invention, FIG. 2 is a view showing a handle and an assembled air motor detached from the handle, FIG. 3 is a perspective view of a portion of a turbine rotor and a rear end plate for said air motor, FIG. 4 is a view of the rear end plate, FIG. 5 is a sectional view of the rear end plate, and FIG. 6 is a fragmentary view of a rotor disk and blades.

Throughout the drawings like numerals refer to like parts.

As illustrated in a preferred embodiment of FIG. 1 there is provided a hand operated air turbine drill including a pistol-grip handle 11 at the rear end having a fitting 12 thereon for receiving compressed air for operating the drill motor. A trigger 13 is provided on the front portion of the handle slidably mounted in a sleeve 14 as also illustrated in FIG. 2. The trigger operates by way of a camming member 16, pivoted to the handle, to open a conventional valve 15. A cavity 17 is provided in the handle for holding a fixed stator 18 circumscribing a rotatable turbine rotor 19 (also partly exploded in FIG. 1). A recess 20 in the end wall 23 of the cavity 17 supports the outer portion of a rear bearing 21, the inner portion of which provides rotatable support for one end of the turbine rotor. A stationary rear end plate 22 fits tightly against the shoulder or rear end wall 23 in the rear portion of the cavity as shown in phantom in FIG. 2, thereby isolating the rear bearing 21 from air flow through the motor.

The rotor 19 is mounted immediately forward of the rear end plate with a support shaft 27 extending therethrough. A small clearance is provided between the rotor and the rear end plate. The rotor is circumscribed by the stator 18 which abuts the rear end plate. The front end of the rotor body is adjacent a stationary front end plate 24 which abuts the stator. The stator extends the entire distance between the front end plate and the rear end plate and is slightly longer than the body of the rotor, thereby spacing the end plates apart when the assembly is clamped together to provide clearance for the rotor. Thus the rotor is surrounded by the assembly of end plates and stator as is shown in FIG. 2. A front bearing 26 is fitted within a cavity in the cup-like front end plate and rotatably supports an end of the rotor. This bearing is located so that the front end plate is between it and the rotor body, thereby isolating the front bearing from the air flow through the drill.

The rotor has an axial shaft 27 extending through the end plates and journaled in the bearings. The rear end of this shaft is press fitted into the inner portion of the rear bearing 21. During operation of the hand drill there is a forward thrust upon the rotor due to the pressure gradient of compressed air from rear to front. The thrust is not large during normal operation and the press fit is sufficient to provide a thrust bearing means for preventing the rotor from rubbing against the front end plate. If desired, a fixed stop can be provided on the rear of the rotor shaft to augment the press fit and prevent shifting of the rotor due to accidental impact of the drill. Likewise a set screw or the like can be used to prevent shifting of the rear bearing in the handle.

The bearings 21 and 26 are preferably high speed ball bearings or the equivalent which are permanently lubricated and sealed to prevent lubricant from entering the stream of compressed air. In addition, both the front and rear bearings are located in a portion of the drill outside of the flow of air to prevent contamination of the air. Air entering the drill is isolated from the rear bearing by the close contact between the rear end plate 22 and the shoulder 23. After passing through the rotor portion of the motor the air is exhausted radially through bleed holes 53 in the stator and prevented from coming in contact with the front bearing by the front end plate. Since no open path exists between the bearings and the environment, no flow of air occurs to entrain contamination from lubricants on the bearings. Small clearance space is provided between the stator and end plates and the rotor so that no parts of the rotor are in rubbing contact with any stationary parts, thereby minimizing production of particulate contamination. Additionally it is not necessary to provide lubrication except on the aforementioned bearings so that no contamination arises therefrom. It has also been found that addition of oil to the rotating portion of the drill motor is deleterious to the operation since it forms a high friction film in the small clearance between the rotor and stator.

The turbine rotor in the illustrative embodiment, which is shown in greater detail in FIG. 3, includes an axial shaft 27 having a shoulder or flange 28 fixed on a rear portion thereof. The shaft has an enlarged mandrel 29 extending forward from the shaft shoulder 28. A plurality of washer like driving disks 31, further described hereinafter, and washer like spacers 32 are closely fitted upon the mandrel in consecutive alternation with each other, that is, between a pair of disks lies a spacer and between a pair of spacers lies a disk. This alternation forms a plurality of spaced apart expansion stages or circumferential rows of blades arrayed along the length of the rotor. A pair of keys or pins 33 pass along the length of the assembly of disks and spacers to prevent relative rotation between the disks and spacers. The view of FIG. 3 shows the construction of the rotor in the illustrative embodiment except that two spacers and a disk and a jam nut are removed to more clearly illustrate the mandrel portion of the shaft. It will be apparent to one skilled in the art that a non-round mandrel could be used with disks and spacers having non-round holes, thereby dispensing with the use of the keys.

Threaded onto the rotor shaft 27 when the rotor is assembled is a jam nut 34 which is tightly forced into abutting position against the end of the rotor disk and spacer assembly to lockingly engage the disks and spacers against the shaft shoulder and secure the entire rotating driving assembly into a substantially rigid body. The rear surface of the front end plate 24 and the front surface of the jam nut 34 are lapped smooth to provide a small and substantially constant gap therebetween. The rear surface of the jam nut has a clearance 35 to accommodate the ends of the mandrel 29 and the keys 33 which extend very slightly beyond the end of the disk and spacer assembly.

Splines 36 are provided on the front end of the rotor shaft for engagement with a pair of planet gears 37 (FIG. 1b) which have their axes spaced apart and are adjacent opposite ends of a diameter of the rotor shaft. The two gears 37 are rotatably mounted in a rear spindle 38 by pins 39 spacing the two gears apart so as to mesh the gears with the splines on the rotor shaft. The gears also mesh with an internal gear (not shown) in the stationary housing 48, thereby causing the rear spindle 38 to rotate when the rotor rotates. A rear spindle bearing 41 rotatably supports the rear spindle.

Splines 42 are provided on the front end of the rear spindle to engage with two planet gears 43 which are rotatably mounted in a front spindle 44 in a manner similar to the rear spindle assembly. A front spindle bearing 46 rotatably supports the front spindle which has an internally threaded portion at the front end thereof. A conventional three-jaw drill chuck 47 is threaded into the front spindle so as to rotate therewith. The front and rear spindle assemblies are contained in a gear case housing 48 which is secured to the handle 11 by a threaded gear case adapter piece 49. The aforementioned internal gear meshing with the planet gears 37 is formed on the inside of the adapter piece. The internal gear meshing with the planet gears 43 is formed on the inside of the gear case housing 48.

Thus during operation of the drill when the rotor revolves, the splines 36 engage with the planet gears 37 to cause rotation thereof. The planet gears are driven around the internal gear, and because of the spaced relation of the planet gears and their rotatable mounting in the rear spindle, the rear spindle is caused to rotate at a rate determined by the gear ratios. In a similar manner the splines 42 on the rear spindle engage the planet gears 43 to cause rotation of the front spindle 44 and the chuck 47.

In the preferred embodiment a gear ratio of 9/1 is provided between the rotor and the rear spindle, that is, the rear spindle revolves at a rate that is less than the rate of rotation of the rotor by this ratio. Similarly a speed reduction of 5/1 is provided by choice of gear ratio between the rear spindle and the front spindle. By having the greater reduction in the first stage the problems associated with high speed bearings are alleviated, and larger size parts can be employed where higher forces are involved.

The rear end plate 22, illustrated in greater detail in FIG. 4 and the sectional view of FIG. 5 is a circular metal disk having a circumferentially extending groove 51 on one side thereof. When assembled in the drill, this groove faces rearwardly. The groove 51 is near the outer periphery of the circular disk and extends in depth most of the way therethrough. The front surface of the rear end plate, that is, the surface not having the groove, is carefully finished to be very smooth so that a small and constant air gap is provided between the rear end plate and the shaft shoulder 28 during operation of the drill motor.

Four apertures 52 are provided between the groove and the other side of the rear end plate. These apertures are equally spaced around the circular groove and are each drilled in a direction so as to have an axis skewed relative to the plane of the rear end plate at an angle 50 of about 30° to 60° in a clockwise direction as viewed from the center of the plate. Preferably the axis of each aperture is skewed at about 35° from the plane of the plate to provide an optimum running speed and torque for all operating conditions. When the angle of the apertures is below about 30° the speed and torque developed are diminished and when above about 60° the free running speed of the motor is decreased, however, the motor will rotate when the rear end plate apertures are straight through, although with decreased efficiency. The optimum high operating speed and torque are produced with a skew angle of 55° between the axes of the apertures and the axis of the disk, that is, the axis of each aperture lies 35° from the plane of the plate.

The stator 18 is a cylindrical thin metal tube or sleeve having a completely smooth bore that is highly finished and machined to close tolerance. By using a completely smooth bore cylinder for the stator, it is possible to machine the interior to very close tolerances, thereby giving efficient operation for a given volume of air. Additionally, fluid friction between stages or rows of blades is minimized and a maximum pressure drop is obtained across the rotating portion of the motor to obtain high utilization of the energy in the air. A plurality of radial bleed apertures 53 are provided in the stator near its front end. These apertures are spaced apart in a row extending circumferentially around the stator and permit expended air to pass radially from the compressed air motor. A plurality of passages 54 are provided in the handle 11 leading from the chamber 17 to the outer portion of the handle. The passages in the handle are approximately adjacent the holes in the stator to receive air therefrom. The passages in the handle have axes that are inclined relative to the cylindrical surface of the handle at a low angle so as to generally direct expended air in a forward direction. These apertures are preferably located on the drill handle at the upper right hand side to direct expended compressed air in a direction convenient for righthanded operators. An exhaust deflector sleeve 56 surrounds the handle at the region having the apertures 54, said sleeve having a plurality of bleed apertures 57 located approximately adjacent the apertures 54 in the handle. A porous metal insert 58 is provided between the apertures 54 and 57 for dispersing the direct blast of compressed air before ejecting the air into the environment to protect operators and workpieces and to provide silencing.

The driving disks 31 on the turbine rotor 19 in the preferred embodiment are constructed of sheet metal, preferably steel, cut into circular disks having a central hole and having a plurality of short radially extending slits 59 from the outside periphery toward the center of the disk. The length of the blades is preferably about $\frac{1}{10}$ to $\frac{1}{8}$ the diameter of the disk to provide a higher torque for a given volume of air. This occurs because the force acting on the blades is placed near the periphery of the disk, hence the force acts with a greater moment arm and high efficiency operation is the result. These slits separate a plurality of radially extending peripheral blades 61. Each of the blades has the outer end thereof twisted from 15° to 30° from the plane of the disk in a counterclockwise direction as viewed radially from the center of the disk and shown by the angle 60 in FIG. 6. An angle of twist lower than 15° produces a lower operating speed and low torque leading to poorer operation. An angle of twist 60 greater than 30° causes an increase in the volume of air passing through the drill with consequent increased operating cost. The inner end or roots of the blades lie in the plane of the disk and there is a substantially uniform transition between the roots and the twisted outer ends of the blades which follow a substantially helical direction around the periphery of the assembled rotor.

The angle between the apertures in the rear end plate and the outer ends of the rotor blades is preferably in the range of from 45° to 75° to give optimum operation with a particularly preferred angle of 50°. When the above angle is less than 45° the torque output of the motor is diminished and when the angle is about 75° torque output is also diminished.

The blades are conveniently made by a stamping operation which forms the outer periphery thereof, the hole for the mandrel, the key way, the slits and the twist on the blades in a single operation. The slits are formed by shearing with no metal removed from between the blades. Each blade has a substantially triangular gap between adjacent blades on a disk wherein the apex of the triangle is toward the center of the disk and the base at the outer ends of the blades. This arrangement apparently reduces turbulence and increases the torque imparted to the blades by directing the principal air flow to the outer periphery of the rotor. Because of the thickness of the stock employed to fabricate the disks, the triangular area between the blades through which air is free to pass does not extend completely to the roots of the blades, i.e., the gap does not extend the full depth of the slits. In the illustrative embodiment there are provided sixteen slits and blades on each of the eight driving disks employed to construct the entire rotor assembly. By having sixteen blades twisted through an angle of from 15° to 30°, the triangular area of the gap between adjacent blades on the disk is relatively smaller than the area of the smooth frontal surface of the blade and a uniform pressure drop is obtained. In the illustrated embodiment the individual disks spaced along the driving assembly are substantially identical and all of the blades thereon are substantially identical to give a substantially uniform pressure gradient along the length of the rotor. The blades in the preferred embodiment are in straight lines along the axial extent of the rotor, however, it will be apparent that a spiral or staggered arrangement of the blades could also be employed.

The circular spacers 32 between the driving disks 31 have an outer diameter which is substantially the same as the extent of the disks at the inner end of the slits 59 or the root of the blades 61. Thus when assembled with the disks, the spacers provide a substantially solid body extending radially to the root of the blades which increases the rotational inertia mass of the rotor and affects the turbulence of the air passing through the motor. The blades extend radially from the spacers a relatively shorter distance than the radius of the spacers so that a large number of small blades are disposed circumferentially on a comparatively large rotor body. In the preferred embodiment the radial extent of the blades is about $\frac{3}{8}$ of the radius of the spacers to give an optimum torque for a given volume of air. At most the radial extent of the blades should be less than $\frac{1}{2}$ of the radius of the cylinder formed by the outer surface of the spacers to give good performance. The spacers between the disks are of such thickness that the rows of blades are spaced apart along the length of the rotor a distance that is relatively smaller than the radial extent of the blades from the spacers. When the rotor is rotating the twisted ends of the blades on a single disk sweep out a circumferential path that is wider, in the axial direction, than the thickness of the material of which the disks are constructed. The relative spacing of the disks along the length of the rotor is such that the distance between the swept out paths of adjacent rows of blades is the same as or less than the width of the paths swept out. A high efficiency of utilization of the air and a suitable pressure gradient are obtained by closely spacing the rows of blades.

The driving assembly is constructed by assembling disks and spacers in consecutive alternation on the mandrel 29 so as to have one end of the group abut on the shaft shoulder 28. The jam nut 34 is tightly threaded on the shaft 27 to secure the driving assembly together as a substantially rigid member. After assembly of the entire rotor 19 the outer ends of the blades on the rotor are carefully ground to ensure concentricity with the shaft 27, circularity and close dimensional tolerance. Likewise the internal cylindrical surface of the stator 18 is machined so as to provide a radial clearance from the outer ends of the blades on the rotor to the cylindrical sleeve stator of not more than 0.0005 inch. Because of the very small space between adjacent blades, larger tolerance between the ends of the blades and the stator cause a very large increase in the consumption of air. While a rotor has been described in the illustrative embodiment having a plurality of parts assembled into a substantially rigid part, it will be apparent to one skilled in the art that the rotor can be made as a single piece or smaller number of pieces to give substantially the same external geometry. Thus, for example, the rotor can be constructed of a precision casting suitably balanced and machined.

The drill illustrated herein is assembled with the side of the rear end plate 22 having the groove 51 abutting the shoulder 23 in the cavity 17. Forward thereof is the cylindrical sleeve stator 18 and the front end plate 24. The two end plates and the stator substantially surround the driving assembly or rotor which is rotatably mounted therein by the bearings 21 and 26. The bleed apertures 53 in the stator are located forward of the frontmost row of blades on the rotor, that is, adjacent the space surrounding the jam nut 34. A fluid flow path is provided between the apertures 53 and the environment via the apertures 54 and 57 and the porous metal insert 58. The splines 36 on the rotor shaft are engaged with the planet gears 37 as above described.

The illustrated hand drill is assembled by sliding the assembly of bearings, end plates, stator and rotor into the cavity in the handle. The adapter piece containing the rear spindle assembly threads into the handle, locking the end plates and the stator into position around the rotor. The gear case housing containing the front spindle assembly threads onto the adapter piece, and the chuck is screwed into the front spindle assembly.

In the operation of the hand drill illustrated in the preferred embodiment compressed air or other gas is supplied to the fitting 12 at preferably 90 to 100 p.s.i. An air passage 62 in the handle directs compressed air from the fitting and valve 15 to the groove 51 in the rear end plate. The air passes into and around the circumferentially disposed groove and passes through the apertures 52 through the rear end plate. These apertures direct the flow of compressed air at an angle against the blades on the rotor. The relative angle between the holes in the rear end plate and the outer ends of the blades is preferably about 45° to 75° with the preferred angle being about 50° to give optimum operation. The compressed air flows through the small triangular gaps between adjacent blades on the first stage of the rotor and in a like manner through the entire driving assembly. The air then passes radially through the apertures 53 in the stator, outwardly through the apertures 54 in the handle, through the porous metal insert 58, and finally through the apertures 57 in the sleeve 56 to the environment without contacting rubbing parts or lubricated areas. The air impinging on the driving blades at an angle and the angular twist on the blades cause the air to be deflected in a single direction and results in a force being applied to the rotor by the compressed air, causing the rotor to rotate.

By having a large number of small blades located near the outer periphery of the rotor a relatively high torque is obtained for a given air consumption. Likewise by providing for a relatively small gap between the individual blades in each row a relatively small amount of air is consumed to provide the driving torque for a drill motor. The quantity of air employed is minimized by the very small radial clearance between the blade ends and the stator. Additionally by having a triangular area between the individual blades in a row the main flow of air is at the outer ends of the blades thereby providing the highest torque for a given air consumption.

In order to provide a preferred torque on a drill bit with the described drill motor, a gear reduction in the two stages described above of about 45/1 from the rotor speed to the chuck speed is provided. In a one-quarter inch drill constructed according to the principles of this invention having an eight stage turbine rotor about 1.1 inches in diameter and a gear reduction of 45/1, the chuck rotation is at a speed in excess of 1900 revolutions per minute when it is free running, that is, with no load thereon. Thus, the free running speed of the rotor in the compressed air motor is in excess of 85,000 r.p.m. Tests of operating speed and torque made with compressed air at 90 pounds per square inch indicate that the quantity of air employed does not exceed 14.5 cubic feet per minute in this drill. When the described one-quarter inch drill is running at high speed the torque produced on the chuck is about 50 inch-lbs. and when the chuck is completely stalled and 90 p.s.i. air is applied a torque of about 18 inch-lbs. is exerted on the chuck.

In order to verify the applicability of the described drill for use in dust free environments, tests were conducted to determine the particles produced or expelled by the drill. Dry filtered nitrogen gas at 90–100 p.s.i was employed in these tests to power the described drill. Two standard cylinders of nitrogen were emptied through the drill motor and thence to special dust filters. Examination of the filters for contamination indicated that for dust particles in the size range of 5–65 microns, a total of 200 particles was collected. In the range of particles greater than 65 microns there were 8 particles. This particle count is acceptable for high quality dust free areas.

In operating the described hand drill in conventional drilling operations a highly unexpected result is observed. It is found that the drill described herein is capable of drilling holes in highly resistant materials that resist efforts at drilling with conventional electric and air powered drills. Thus, for example, a ¼ inch high speed steel drill bit in a drill constructed according to the principles of this invention successfully drilled sixteen holes through a ¼ inch thick plate of titanium alloy. A similar drill bit in a conventional drill (of a type that is standard equipment in the production facilities of applicants' assignee) was dulled in attempting unsucessfully to drill three holes in the same material. The dull drill bit was then fitted into the aforementioned turbine drill, constructed as described herein, and the three holes were completed and eight additional holes made in the titanium without further sharpening of the drill bit.

Similarly a ¼ inch tungsten carbide drill bit failed to drill hardened René 41 when tried in several conventional drills. The same drill bit fitted in a drill constructed according to the principles of this invention successfully drilled three holes through hardened René 41. René 41 is a high strength, tough nickel base alloy having the following composition: 0.1% C, 19% Cr, 11% Co, 10% Mo, 3% Ti, 3% Fe, 1.5% Al, balance Ni. In a like manner, drilling of a ¼ inch H–11 steel plate was unsuccessfully attempted with conventional air powered drills having rotational speeds of 45, 500, 850 and 2800 r.p.m. respectively. No perforation could be obtained with a ¼ inch high speed steel drill bit. A ¼ inch high speed drill bit fitted into a drill constructed according to the principles of this invention successfully drilled 14 holes through the H–11 steel plate. H–11 steel is a high-strength tool steel having the following composition: 0.35% C, 5% Cr, 0.40% V, 1.50% Mo, balance Fe.

In these materials as in many other modern high-strength tough materials, any required holes formerly had to be drilled before hardening and to be drilled with stationary equipment having closely controlled speed and feed to obtain optimum drilling parameters for the particular material. The drill constructed according to the principles of this invention has made possible drilling with portable equipment and without expensive adjustments of equipment for the material to be drilled.

An air turbine hand drill constructed according to the principles of this invention provides an ability to drill modern high strength materials that is not available with prior art hand drills. Prior drills maintain a substantially constant rotational speed despite the torque resisting rotation up to a value of applied torque which causes the drill to stall. The described hand drill loses rotational speed when the drill bit encounters high resistance. It would appear that the rotational speed of the drill described herein is regulated in a manner inversely related to the resistance due to the cutting, thereby automatically assuming a proper speed for optimum drilling for the conditions encountered. The proper speed for drilling is dependent on the material being drilled, the size of the drill bit, and the sharpness of the cutting edges on the drill bit. These conditions may vary as drilling proceeds through a material and the optimum rotational speed may also vary during the drilling operation. The described drill adjusts rotational speed in response to the resistance encountered and provides a continuously adjustable speed for optimum operation for drilling high strength materials or conventional materials.

As the turbine motor rotates the air passes from one stage to the next and imparts some additional thrust to the rotor at each row of blades. With the smooth bore stator of the described drill the direction of the principal flow of air from one row of blades to the next is dependent on the relative speed of rotation of the rotor and the velocity of flow of air along the length of the rotor. Since the volume of air passing through the drill is relatively independent of speed of rotation, the angle of impingement of the air on all stages subsequent to the first one is dependent principally on the rotational speed of the rotor. It would appear that the variable angle of impingement causes a variation in torque which is dependent on speed and provides a self-regulating action. The uniformity of the cutting that is provided by the self-regulating action is indicated by the curled chips obtained with the hand held drill as compared with the small broken pieces of chip obtained with conventional drills.

Although the operation of the drill is well suited to hand held operation it will be clear that mechanical supports and feed mechanisms may also be employed or pneumatic drill assists used in the operation of the drill. While a hand drill has been described in the preferred embodiment, it will be apparent to one skilled in the art that an air motor constructed according to the principles of the invention can be used to operate hand held or stationary equipment and is also useful in other tools such as routers or grinders.

It is to be understood that the above described embodiment is merely illustrative of the application of the principles of this invention. Those skilled in the art may readily devise other variations that will embody the principles of the invention. It is therefore to be understood that within the scope of the appended claims the invention may be practiced otherwise than as specifically described.

What is claimed is:

1. A rotor for a fluid powered motor comprising:
   a rotor shaft having a shoulder portion,
   a driving assembly on the shaft abutting the shaft shoulder and having a plurality of washer like driving disks; each of said disks having a plurality of radially extending slits extending inwardly from the periphery of the disk, defining a plurality of substantially identical radially extending blades between the slits, the ends of the blades defining a first cylinder and having the outer ends of the blades skewed relative to the plane of the disk at an angle of from 15° to 30°, the inner ends of the blades extending circumferentially and the blades having a smooth transition between the inner and outer ends; and a plurality of washer like spacers assembled in consecutive alternation with said disks on the shaft, said spacers collectively defining a cylinder having a diameter substantially the same as a diameter of the disks at the inner end of said slits for providing a large rotational inertia, said blades extending a relatively shorter distance radially from said spacers than the radius of the spacers, and the distance between said disks being relatively smaller than the radial extent of the blades from said spacers, said disks being axially aligned so that each blade is aligned with a corresponding blade on an adjacent disk;
   means for preventing relative rotation of the disks; and
   a jam nut secured on the shaft and in locking engagement with the driving assembly of disks and spacers.

2. A fluid operated power motor comprising:
   a cylindrical rotor body,
   a plurality of identical, thin, smooth-faced driving blades extending radially from said rotor body, each of said blades having a base extending circumferentially of the rotor body and an end skewed relative to a circumference of the rotor body at an angle of from 15 to 30°, thereby defining a triangular gap between edges of adjacent blades having an area relatively smaller than the area of the smooth face of a blade, said blades collectively forming a plurality of axially spaced rows on the rotor body, each row extending circumferentially of the rotor body, and having adjacent rows axially spaced apart a distance that is relatively smaller than the radial extent of the blades from the rotor body and to provide a distance between areas swept out by rotation of adjacent rows that is not greater than the axial extent of one of such rows,
   said rotor body comprising a cylindrical portion extending substantially to the bases of said blades and having a radius substantially greater than the radial extent of the blades from said rotor body for providing a large rotational inertia mass and affecting fluid turbulence between said rows,
   an unobstructed cylindrical smooth bore stator closely fitting around said blade ends with a clearance therebetween of not more than 0.005,
   means for rotatably supporting the rotor body in the stator,
   means for admitting pressurized fluid to an end of the motor adjustment
   motor adjacent said blades, and
   means for discharging fluid from another end of the motor.

3. The motor of claim 2 wherein said means for admitting pressurized fluid includes means for directing admitted fluid toward the blades at an angle of from 30° to 60° relative to the rotor body axis.

4. A fluid operated power motor comprising:
   a cylindrical rotor having a body, a shaft extending axially from the body, and driving blades extending radially from the body,
   a smooth bore cylindrical stator around said rotor,
   means for rotatably supporting the rotor in the stator,
   a rear end plate adjacent to end of the rotor body and abutting an end of said stator, said plate having a plurality of apertures therethrough for directing compressed fluid against faces of the blades,
   a front end plate adjacent another end of the rotor body and abutting another end of said stator,
   each of said driving blades extending circumferentially on the body at an inner end and helically at an outer end and having a substantially smooth transition therebetween,
   said blades being arrayed circumferentially on the rotor to form a plurality of axially spaced apart rows, the outer ends of the blades collectively defining the outermost cylindrical form of the rotor,
   said stator having a plurality of circumferentially spaced fluid discharge orifice means proximate the front end plate for discharging fluid radially.

5. The motor of claim 4 wherein the helical outer ends of the blades are skewed relative to the inner ends at an angle of from 15° to 30°, and wherein
   said apertures through the rear end plate are angulated relative to the outer ends of the rotor blades at an angle of from 45° to 75°.

6. A gas driven motor comprising:
   a rotatably mounted shaft,
   a plurality of mutually spaced disks fixedly mounted on the shaft, each disk having a plurality of peripherally positioned circumferentially arrayed blades, each blade being skewed relative to a plane perpendicular to the axis of the shaft at an angle of from 15° to 30° and having a radial extent substantially less than the radial distance from the shaft axis to the inner end of the blade, a plurality of spacers fixedly mounted on the shaft and in consecutive alternation with the disks, each spacer having a radius substantially equal to said radial distance, said disks being spaced apart by said spacers so that the distance between paths swept out by rotation of blades on adjacent disks is not greater than the width of such paths, a fixedly mounted cylindrical stator having a smooth inner surface circumscribing the outer ends of said blades and uniformly spaced therefrom by not more than 0.0005 inches, means for exhausting gas adjacent one end of the stator, and means at the other end of the stator for directing gas at the blades of the disk nearest said other end at a predetermined angle relative to the axis of the shaft.

7. A gas driven motor comprising:
a housing having an inner end wall, a bearing recess in said wall, and a conduit for communication with a source of pressurized gas, a shaft, bearing means on an end of the shaft and mounted in the recess to provide a journal for the shaft, a plurality of blades fixed on the shaft, an end plate in said housing between the blades and the bearing means, said plate having a diameter greater than the diameter of the bearing means and having an outer face extending over and beyond said recess in close proximity to said inner end wall to enclose said bearing means in the recess, said end plate having an annular groove and a plurality of apertures extending through said end plate from said groove to direct fluid from the conduit to the blades, and wherein said conduit communicates with said groove remote from said recess.

8. An air turbine hand drill for use in contamination free areas comprising:
a handle member having an air delivery passage, a rotor having a plurality of radially extending blades, a smooth bore stator in said handle member circumscribing said rotor and spaced apart therefrom, a first end member adjacent an end of the rotor and spaced apart therefrom, said end member having an air receiving portion adjacent said air delivery passage and means for directing air to the rotor and against the blades, a second end member adjacent another end of the rotor and spaced apart therefrom, means for discharging air from said rotor, first bearing means for rotatably supporting an end of the rotor, located adjacent the first end member on an opposite side thereof from the rotor and isolated from the means for directing air, and second bearing means for rotatably supporting another end of the rotor located adjacent the second end member on an opposite side thereof from the rotor and isolated from said means for discharging air.

9. An air powered hand drill having a front end and a rear end comprising:
a handle at the rear end thereof including means for receiving compressed air and means for controlling flow of compressed air, a rotatably mounted turbine rotor having a front end and a rear end comprising a shaft having a shoulder portion, a driving assembly on the shaft abutting the shoulder portion and having a plurality of circular driving disks and a plurality of circular spacers in consecutive alternation with the disks; means for preventing rotation of said disks relative to each other and a jam nut on the shaft for securing the disks and spacers against the shoulder portion; each of said disks having a plurality of inwardly directed radially extending peripheral slits defining a plurality of radially extending blades around the periphery of the disks, each of said blades having an outer end thereof twisted from the plane of the disk; said spacers collectively defining a cylinder having a radius substantially the same as a radius to an inner end of the slits; said shaft extending rearwardly of the shoulder portion and forwardly of the nut, a smooth bore cylindrical sleeve circumscribing the rotor and secured in the handle, said sleeve being concentric with the rotor and including a plurality of radially extending bleed apertures therethrough forwardly of the blades on the rotor, a rear end plate in the handle adjacent the rear of the turbine rotor, said rear end plate having a plurality of apertures extending from a first side of the plate to a second side of the plate adjacent the turbine rotor, said apertures each having an axis lying skewed relative to the axis of the rotor, a front end member having a smooth surface adjacent the nut on the rotor, said rear end plate, front end member and cylindrical sleeve substantially surrounding the driving assembly of the turbine rotor, a drill chuck on the front end of the hand drill, and means for rotating the drill chuck in response to rotation of the turbine rotor.

10. An air powered hand drill having a front end and a rear end comprising:
a handle at the rear end thereof including means for receiving compressed air and means for controlling flow of compressed air, a turbine rotor rotatably mounted in said handle having a front end and a rear end including a shaft having a shoulder portion, a driving assembly on the shaft abutting the shoulder portion and having a plurality of circular driving disks and a plurality of circular spacers in consecutive alternation with the disks; means for preventing rotation of said disks relative to each other and a jam nut on the shaft for securing the disks and spacers against the shoulder portion to form a substantially rigid body, each of said disks having a plurality of circumferentially disposed inwardly directed radially extending sheared surfaces separating a plurality of radially extending peripheral blades, each of said blades having an outer end thereof twisted from the plane of the disk; said spacers collectively defining a cylinder having a radius substantially the same as a radius to an inner end of the sheared surfaces; said shaft extending rearwardly of the shoulder portion and forwardly of the nut and having driving means on the front end thereof, a smooth bore cylindrical sleeve circumscribing the rotor and secured in the handle, said sleeve being concentric with the rotor and having a small radial clearance therefrom, and including means for discharging air forwardly of the blades on the rotor, a rear end plate adjacent the rear of the turbine rotor having a first side thereof adjacent the turbine rotor and a plurality of apertures extending from a second side to the first side of the plate, said apertures being a common distance from the center of the plate and skewed a common angle from the plane of the plate, a front end member having a smooth surface adjacent the jam nut on the rotor, said rear end plate, front end member and cylindrical sleeve substantially surrounding the driving assembly of the turbine rotor, a drill chuck on the front end of the hand drill, and gear reduction means between the drill chuck and the turbine rotor for providing relative rotation therebetween.

11. An air powered hand drill having a front end and a rear end comprising:
a handle at the rear end thereof including means for receiving compressed air and trigger operated means for controlling flow of compressed air, a turbine rotor having a front end and a rear end comprising a shaft having a shoulder portion, a driving assembly on the shaft abutting the shoulder portion and having a plurality of one-piece circular driving disks and a plurality of circular spacers in consecutive alternation with the disks; each of said disks and spacers having a central aperture for tight fitting assembly on the shaft normal to the axis thereof, means for preventing rotation of said disks relative to each other and a jam nut near the front end of the shaft for securing the disks and spacers against the shoulder portion; each of said disks having a plurality of radially extending slits defining a plurality of integral radially extending peripheral blades; each of said blades having an outer end thereof twisted about 15° from the plane of the disk in a counterclockwise direction as viewed radially from the center of the disk; said spacers collectively defining a cylinder having a radius substantially the same as a radius to an inner end of the slits; said shaft extending rearwardly of the shoulder portion and forwardly of the nut and having longitudinally extending splines on the front end thereof, a smooth bore cylindrical stator sleeve circumscribing the rotor and secured in the handle, said sleeve being concentric with the rotor and having a radial clearance from the outer ends of the blades on the rotor of not more than 0.0005 inch and including a plurality of radially extending bleed apertures therethrough forwardly of the blades on the rotor, a first high speed bearing means in the handle for rotatably supporting the turbine rotor shaft at the rear end thereof, a rear end plate between the first bearing means and the rear end of the turbine rotor having a circumferentially extending groove in a first side thereof remote from said rotor driving assembly and a plurality of apertures extending from the groove to a second side of the plate, said apertures each having an axis lying skewed relative to the axis of the rotor at an angle of about 55° in a clockwise direction as viewed from the center of the plate, a front end member having a smooth surface adjacent the jam nut on the rotor, said rear end plate, front end member and cylindrical stator sleeve substantially surrounding the driving assembly of the turbine rotor, a second high speed bearing means supported by the front end member in a portion remote from said rotor driving assembly for rotatably supporting the turbine rotor shaft at the front end thereof, a rotatably mounted rear spindle assembly for speed change comprising a rear spindle having a plurality of parallel symmetrical spaced apart planet gears rotatably supported thereon, said gears engaged with the splines on the turbine rotor shaft and rotatable thereabout, said spindle having longitudinally extending splines on an end thereof, a rotatably mounted front spindle assembly for speed change comprising a front spindle having a plurality of parallel symmetrically spaced apart planet gears rotatably supported thereon, said gears engaged with the splines on the rear spindle and rotatable thereabout, a housing means secured to the handle for rotatably supporting the rear and front spindle assemblies, and meshing with said planet gears, and a drill chuck on the front end of the hand drill and secured to the front spindle for rotation therewith.

References Cited by the Examiner
UNITED STATES PATENTS

| | | | |
|---|---|---|---|
| 1,112,008 | 9/14 | Holdsworth | 253–3 |
| 1,502,289 | 7/24 | Boyer | 253–57 |
| 2,016,831 | 10/35 | Havill | 230–119 |
| 2,292,453 | 8/42 | Mere | 253–3 |
| 2,768,546 | 10/56 | Amtsberg. | |
| 2,861,195 | 11/58 | Salzer | 253–31 |
| 3,093,360 | 6/63 | Krouse | 253–2 |

KARL J. ALBRECHT, *Primary Examiner.*

HENRY F. RADUAZO, *Examiner.*